United States Patent [19]

Hagelthorn

[11] Patent Number: 5,560,687
[45] Date of Patent: Oct. 1, 1996

[54] CONTROLLED POSITION AXLE NUT AND METHOD SYSTEM TO PRELOAD TAPERED ROLLER BEARINGS

[75] Inventor: George A. Hagelthorn, Dearborn, Mich.

[73] Assignee: Hub Nut Corporation, Lafayette, Ind.

[21] Appl. No.: 203,827

[22] Filed: Mar. 1, 1994

[51] Int. Cl.$^6$ .................................................. B60B 21/00
[52] U.S. Cl. .................................... 301/105.1; 301/124.1; 384/517; 384/562
[58] Field of Search ................................. 301/105.1, 111, 301/114, 115, 124.1, 126, 131, 35.63, 35.55, 35.58; 180/254, 258, 259; 29/898.07; 384/517, 540, 562, 563, 583

[56] References Cited

U.S. PATENT DOCUMENTS

| | | | |
|---|---|---|---|
| 1,252,455 | 1/1918 | Lee | 301/105.1 X |
| 1,286,438 | 12/1918 | Smith | 301/105.1 X |
| 1,437,833 | 12/1922 | Buckwalter | 29/898.07 X |
| 1,811,679 | 6/1931 | Volet | 384/540 X |
| 2,110,126 | 3/1938 | Gannett | 301/105.1 X |
| 2,609,243 | 9/1952 | Ponnequin | 301/105.1 X |
| 3,125,897 | 3/1964 | Zeman | 384/583 X |
| 3,294,141 | 12/1966 | Scotthoefer et al. | 384/562 X |
| 4,530,144 | 7/1985 | Hagelthorn . | |
| 5,174,839 | 12/1992 | Schultz et al. | 301/105.1 X |
| 5,190,355 | 3/1993 | Hobbie et al. | 301/105.1 |

FOREIGN PATENT DOCUMENTS

| | | | |
|---|---|---|---|
| 193136 | of 0000 | France | 301/105.1 |
| 41616 | 1/1880 | Germany | 301/105.1 |
| 1880 | of 0000 | United Kingdom | 301/105.1 |
| 20638 | of 1904 | United Kingdom | 301/105.1 |
| 199494 | 6/1923 | United Kingdom | 384/583 |
| 1023637 | 3/1966 | United Kingdom | 384/517 |

OTHER PUBLICATIONS

"Means to Accurately Install Tapered Roller Bearings", SAE Technical Paper, George Hagelthorn, Nov. 1994.

*Primary Examiner*—Russell D. Stormer
*Attorney, Agent, or Firm*—Trexler, Bushnell, Giangiorgi & Blackstone, Ltd.

[57] ABSTRACT

The spindle ends of an axle of conventional design are provided with either right hand or left hand threads to receive respective axle nuts in combination with special lock ring fasteners. A nut of standard configuration used for tapered roller bearing adjustment and hereafter described as the adjustment nut is threaded into position having torque applied to it in a controlled manner to achieve specific preload bearing pressure against the inner race of the outer wheel bearing through a washer whose internal tab projects into the spindle keyway after which a threaded lock ring is rotated into contact with the adjustment nut. Having achieved positive positioning of the threaded lock ring in bearing contact with the adjustment nut, a retainer is installed to secure the lock ring in position on the threads of the axle spindle preventing further rotational movement. With the threaded lock ring secured in position to prevent any outward movement of either the wheel assembly components or the inner adjustment nut, the adjustment nut is rotated in the opposite direction by which it was installed until it jams forcibly against the threaded lock ring. With this rotational movement of the adjustment nut, the original bearing pressure or preload exerted outward against the adjustment nut is transferred and begins to bear against the threaded lock ring. Because of this action, the adjustment nut is converted from a load bearing fastener to that of a spacer and its new purpose is to control the spatial relationship between the inner race of the outer bearing and the threaded lock ring. Even with additional rotational movement and application of a specified amount of torque to the adjustment nut, the original preload bearing pressure is retained, but a jammed condition develops between the adjustment nut and the threaded lock ring making the installation safely secure for highway operations.

27 Claims, 6 Drawing Sheets

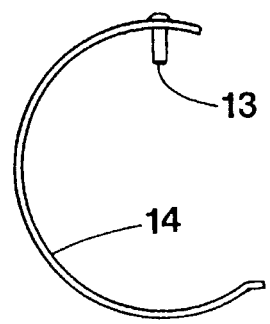
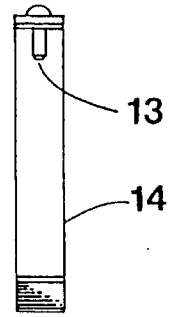
FIG. 9  FIG. 10
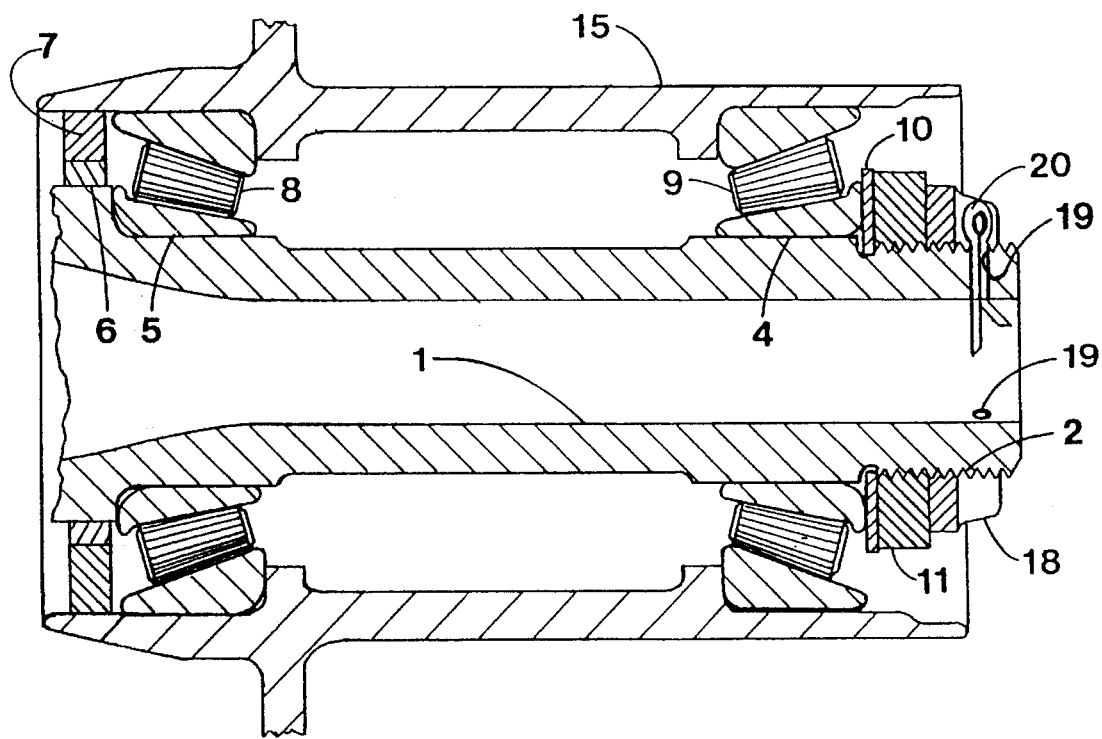
FIG. 11

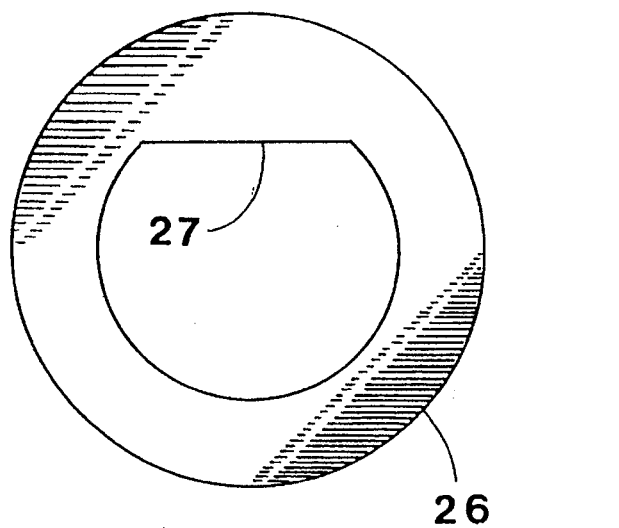
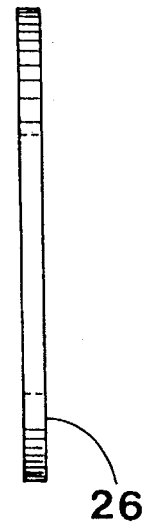
FIG. 19    FIG. 20
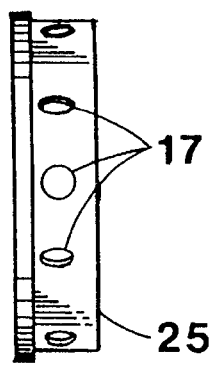
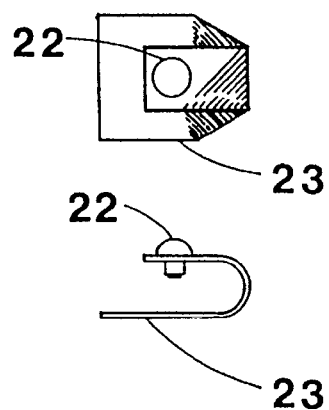
FIG. 21
FIG. 22
FIG. 23

5,560,687

CONTROLLED POSITION AXLE NUT AND METHOD SYSTEM TO PRELOAD TAPERED ROLLER BEARINGS

BACKGROUND OF THE INVENTION

The need for means to safely install wheels on tractor/trailer combination vehicles has long been recognized and numerous solutions have been made available. However, these solutions are limited in application because they are of a single nut design without the means to be rigidly fixed and secured in position on the axle spindle.

In 1965, a major producer of highway trailers introduced a new industry axle having a wheel retention system consisting of a single nut held in place by a cotter pin. At that time, there was no interest in providing an axle nut system which could be adjusted for specific amounts of preload; a compressive force on the bearings, because the tapered roller bearing manufacturers did not advocate advantages would occur with that type of installation. The technique of wheel installation with that trailer manufacturer's single nut design was merely to tighten the wheel assembly in place and then back off the single nut to a position of loose clearance before placing a cotter pin in position to prevent rotational movement. The disadvantages of this arrangement soon materialized with a rash of "lost wheels" resulting in many disastrous accidents. Investigations showing the single axle nut marketed by this trailer manufacturer were unsafe for a number of reasons and the following conclusion issued by the National Highway Traffic Safety Administration: "Analysis reveals that a problem did exist which (the company) should have addressed with a safety recall in 1984". For specifics regarding this issue, attention is invited to the NHTSA Engineering Analysis Action Report EA88-024, dated Jun. 5, 1989.

Subsequent to the publication of the National Transportation Safety Board Special Investigation Report, NTSB/SIR-92/04, PB92-917004, adopted Sep. 15, 1992, which detailed accounts of lost wheel incidents, recommendations were directed to the attention of the American Trucking Association specifying the need to "Promote an educational program on proper wheel tightening procedures through carriers, manufacturers, government".

Recognizing the need for remedial action, efforts were initiated leading to the development of this invention. Coupled with this recognition was the awareness of industry's progress to improve tapered roller bearing adjustment. With this stimulation, the Controlled Position Axle Nut System was conceived and tested with substantiating results.

Because a potential weakness with all single nut designs produced for the industry is the inability to consistently eliminate all degrees of freedom between the threads of the spindle and those of the nut, it was part of the initial parameters to develop a retention system configured with jamming members to control this problem. In the course of development, several tapered roller bearing manufacturers advised that a controlled amount of preload within the tapered roller bearings wheel assembly was not only acceptable, but it would be recommended if an accurate means could be achieved for that purpose.

Until the time of this invention, no double nut configuration was capable of being installed on the axles of tractor/trailer combination vehicles with the means of providing any measure of controlled preload on the tapered roller bearings. In achieving the final jammed condition between the two nuts involved, it was always the case that the outer nut had to be tightened against the inner nut and during that process additional pressure was brought to bear against the bearings. The amount of additional preload pressure was relative to the amount of thread clearance which existed between the threads of the inner nut and the threads of the spindle. The tolerances of manufactured threads on axle nuts were so variable that inconsistent preload pressures would occur as a result of the inward movement of the inner nut through the space or lash between mating threads as the outer nut was tightened into the jammed condition. For this reason, the recommended practices by all manufacturers for installation of double nuts on tractor/trailer applications call for a back off of the inner nut prior to installing and tightening the outer nut. Currently, at this writing, recommendations have not been published indicating that tapered bearing preload would be acceptable but this has been projected to occur in the near future.

With the availability of this double member jamming retention system; A Controlled Position Axle Nut System, it is now possible to apply a specific amount of preload and to retain that pressure on the bearings during the subsequent and final tightening operation. An additional advantage of this invention is its ability to install and maintain a specific amount of clearance between the bearing and the retention members if so desired.

OBJECTS OF THE INVENTION

An object of this invention is to provide a method to place wheel assemblies on axles which includes a primary means to apply a specific amount of installation pressure, known as "preload", to the tapered roller bearings while being able to maintain that original bearing pressure or adjustment as the assembly is being secured with a secondary means to effect a jammed condition of both means on the axle threads.

Another object of this invention, if so desired, is to provide a solution using those same components which were designed to provide controlled "preload" within the wheel assembly to accommodate a need for measured clearance between the outer tapered wheel bearing and the retention members.

Further, another object of this invention is to offer recommendations on how its principles can be applied to all conventional axles currently in use explaining how all existing axles can be retrofitted without alterations merely by replacing the fasteners.

Continuing, another object of this invention is to provide the solution for a recognized industry problem; specifically the need to replace the single nut/cotter pin configuration which has been shown to be unreliable and unsafe on the highway.

Still further, another object of this invention is to make it possible to employ wheel retention threaded components such as nuts with threads of excessive tolerance without compromising the integrity of the bearing adjustment procedures.

Accordingly, another objective is to provide a double fastener combination which, after the adjustment nut has been installed using conventional torque wrenches, provides for an outer member which is brought to bear against the inner adjustment nut by the mechanic or installer manually to a finger tight condition. Intentionally, the outer member is not equipped with means to apply torque using a wrench or tool by which excessive pressure can be brought to bear against the adjustment nut. The purpose served in this instance is to prevent the positioning of the outer means in such a way as to increase the preload force applied by the adjustment nut against the tapered roller bearings.

The final objective of this invention is to satisfy the need for a reliable and safe wheel assembly installation on tractor/trailer combination vehicles guaranteeing the advantages of precise adjustment without incurring excessive cost for precision parts.

BRIEF DESCRIPTION OF THE DRAWINGS

FIG. 9 is a plan view of the locking member which assembles to the outer ring shown in FIG. 7.

FIG. 10 is a side view of the locking member shown as FIG. 9.

FIG. 11 is an illustration of an alternate configuration used to retrofit existing axles having single nuts which functions in the same manner as the preferred embodiment, but has variations of the inner means and the outer means with the outer means being positioned and secured with a cotter pin.

FIG. 19. shows the "D" washer used in conjunction with a milled axle spindle such as shown in FIG. 18.

FIG. 20. is the side view of FIG. 19.

FIG. 21. is a side view of the lock ring used in conjunction with the milled axle spindle shown in FIGS. 17 and 18. This lock ring is a modified form of that shown earlier as FIG. 8 in order to allow placement of the locking member from the side to engage one of the index holes as well as serving as an interference member in the cavity between the milled surface of the axle spindle and the inner surface of a top view of a locking.

FIG. 22 is the locking member which serves to secure the outer means or lock ring with respect to the axle spindle after being placed in position against the inner means or nut.

FIG. 23 is a side view of the locking member shown in FIG. 22.

DESCRIPTION OF A PREFERRED EMBODIMENT

Figure 1:
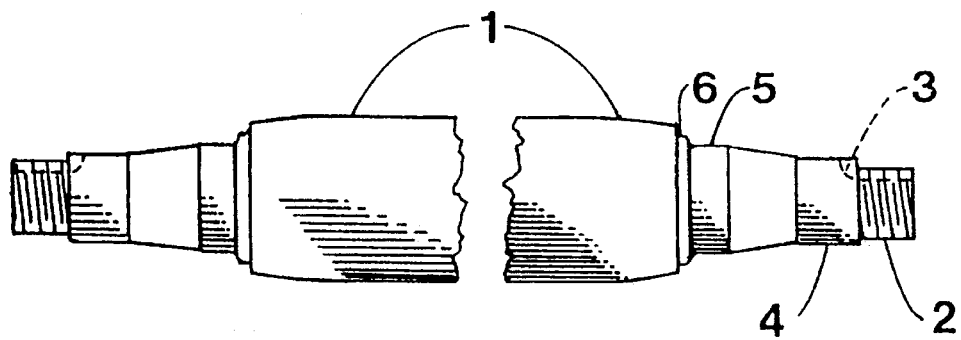
FIG. 1 is the representation of an axle beam without any accouterments showing the two spindles in final form following the machining operations.
Figure 3:
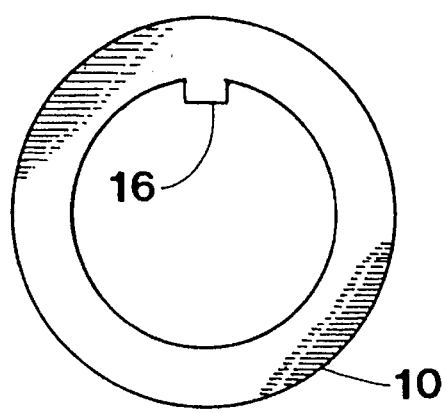
FIG. 3 is a plan view of the stationary washer which is positioned on the axle between the inner means described in this instance as the inner nut and the inner race of the outer tapered roller bearing.
Figure 4:
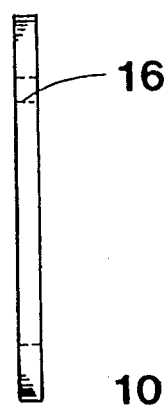
FIG. 4 is a side view of the stationary washer shown in FIG. 3.
Figure 5:
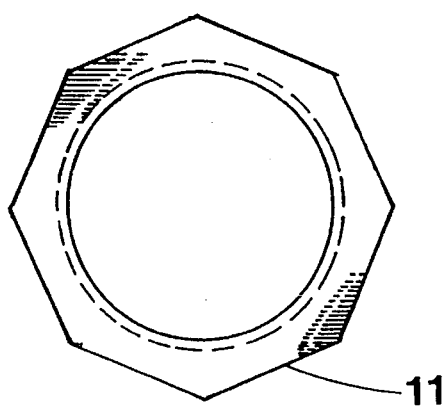
FIG. 5 is a plan view of the inner means depicted as a nut in this illustration.
Figure 6:
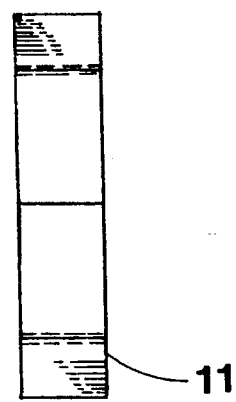
FIG. 6 is a side view of the nut shown in FIG. 5.
Figure 7:
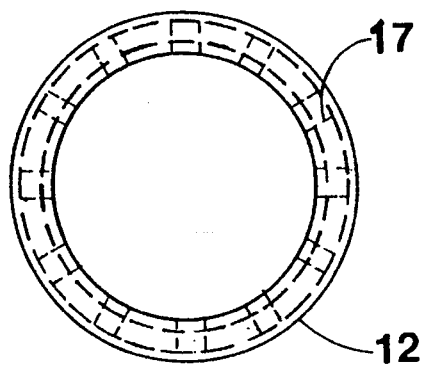
FIG. 7 is a plan view of the outer means shown as a ring having an annular slot to accommodate a locking member and shown with a plurality of holes to accept the locking member having a projection which extends into the axle spindle keyway serving to secure the outer means at the selected position.
Figure 8:
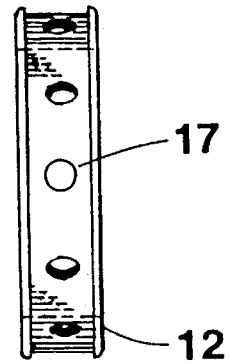
FIG. 8 is a side view of the outer means shown in FIG. 7.

In FIG. 1, an axle beam 1 is provided with conventional threads 2, a washer keyway 3, an outer bearing journal 4, an inner bearing journal 5, and an oil seal surface journal 6. The threads 2 accommodate the adjustment nut 11 (shown in FIGS. 5 and 6) and the threaded lock ring 12 (shown in FIGS. 7 and 8). Washer keyway 3 serves to engage the inner projection 16 of a washer 10 which is shown in detail in FIGS. 3 and 4 and the interference member 13 which is part of the retainer clip 14, both of which are shown in detail in FIGS. 9 and 10.

Figure 2:
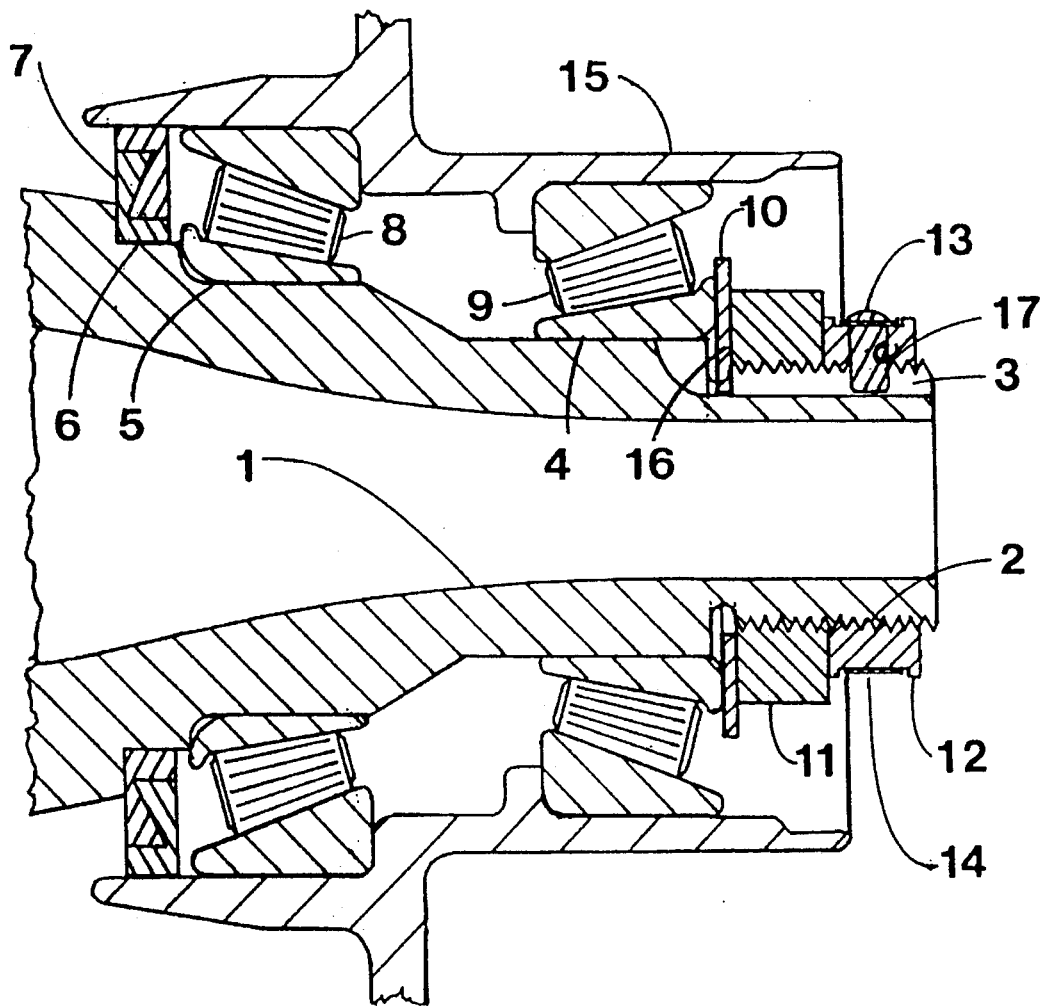
FIG. 2 is a longitudinal preferred embodiment section view of the axle spindle in FIG. 1 having assembled thereon the components comprising the wheel and axle assembly showing the respective relationship of all members in their final assembled positions.

Referring to FIG. 2, an oil seal 7, is shown in respective position mounted between wheel or hub 15 and axle spindle 1 inner tapered roller bearing 8 is positioned between the wheel or hub 15 and the bearing journal 5. Similarly the outer tapered roller bearing 9 is positioning in its working arrangement between the wheel or hub 15 and the outer bearing journal 4 of the axle spindle. The assembly process provides for placement of the tabbed washer 10 around the threaded diameter 2 with its internal projection 16 engaged with keyway 3 followed by placement of the adjustment nut 11 in position to be tightened with a specific amount of torque applied by a calibrated torque wrench (not shown). The amount of installation torque applied by the torque wrench complies with recommendation which correlate with the relative amount of preload pressure against the bearing 8 and 9 advocated by bearing manufactures for reliable and safe operations. Having established the desired preload bearing pressure by controlled tightening of the adjustment nut 11, the threaded lock sleeve 12 is finger tightened against the inner face of the inner adjustment nut 11 and secured relative to that position with respect to the axle spindle 1 using the retainer clip assembly 14 shown in FIGS. 9 and 10 having an interference projection 13 which extends through one of the annular index holes 17 shown in FIG. 8 of the threaded lock ring 12 to engage the axle spindle keyway 3. The placement of the threaded lock ring 12 in this manner establishes a spatial relationship between its inner face and the outer face of tapered roller bearing 9 with this space being controlled and maintained by the physical unchanging thickness of the washer 10 and the inner adjustment nut 11.

The amount of preload pressure against the outer bearing 9 introduced by torque controlled installation of the inner adjustment nut 11 be retained as long as the space occupied by the washer 10 and the adjustment nut 11 between the threaded lock sleeve 12 and the inner bearing 9 remains uncharged. Again applying a wrench to rotate the inner adjustment nut 11 in the reverse direction from which it was originally installed with controlled torque, the equal and opposite preload force acting through the threads of the inner adjustment nut 11 is transferred from its contact against the threads 2 of the axle spindle 1 into bearing contact with the inner face of the threaded lock sleeve 12. This rotated juxtapositional movement of the inner adjustment nut 11 redistributes the outwar preload force, without change, from the threads of the inner adjustment nut 11 to the threads of the threaded lock sleeve 12. As rotational movement of the adjustment nut 11 continues in the direction that would normally loosen it, the relative position of its threads change with respect to those of the axle spindle 1, but the axial position of the adjustment nut 11 does not change because the stationary and secured threaded lock sleeve 12 physically prevents any outward movement. Reversed rotational movement of the inner adjustment nut 11 can continue until contact between the threads of the inner adjustment nut 11 and the threads 2 of the axle spindle 1 transfers from the outboard thread faces to the inboard thread faces. The amount of rotational movement before this change of thread contact occurs depends on the space between the mating threads sometimes described as "lash". Manufacturing tolerances dictate the amount of lash that will be experienced and this is generally defined, for example, by categorizing the threads as Class 1, Class 2, or Class 3 Variations of the amount of lash present between the threads of the inner adjustment nut 11 and the axle spindle threads 2 do not alter the ability of this invention to effect a controlled amount of tapered roller bearing preload after the inner adjustment nut 11 has been forcibly tightened into a jammed condition with the threaded lock sleeve 12 because retention of the originally installed preload depends on maintaining the spatial relationship between the outer face of the inner race of the outer bearing 9 and the inner face of the threaded lock ring 12. This spacing remains unchanged following installation of the threaded lock ring 12 because the physical thickness of the washer 10 and the inner adjustment nut 11 does not vary. After an ideal jammed condition has been applied between the adjustment nut 11 and the threaded lock ring 12 in accordance with the manufacturer's recommendations, the wheel 15 has now been positioned on the axle spindle 1 and the desired amount of preload originally applied by the calibrated torque wrench is perpetuated in the tapered roller bearing 8 and 9 in the wheel 15 and axle spindle 1 assembly. Since the inner adjustment nut 11 is positioned against the threaded lock sleeve 12, the nut 11 is retained against retrograde axial movement.

Having described the preferred embodiment, an alternate concept will be additionally described for the reason that it is a design specifically applicable to retrofitting numerous industry axles currently in use in highway operations. Some of these axles were identified by the National Highway Traffic Safety Administration as the type which should have been recalled by virtue of having single axle nuts with manufacturing deficiencies.

Figure 12:
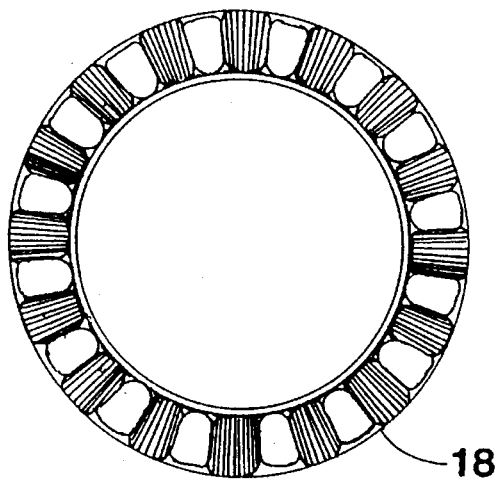
FIG. 12 is the plan view of a castellated outer member or lock ring used in conjunction with a cotter pin as shown in FIG. 11.
Figure 13:
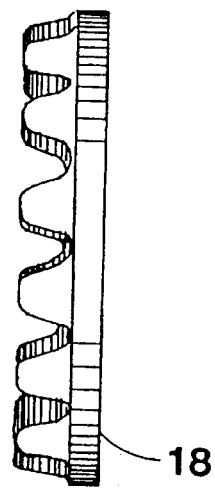
FIG. 13 is a side view of the castellated outer member or lock ring shown in FIG. 12.
Figure 14:
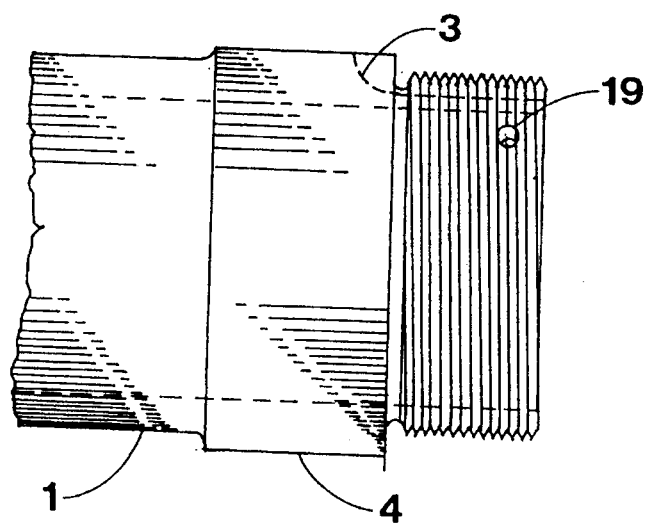
FIG. 14 is a longitudinal view of a typical axle spindle currently in use which can be retrofitted using the inner and outer means shown in FIGS. 5 and 12.
Figure 15:
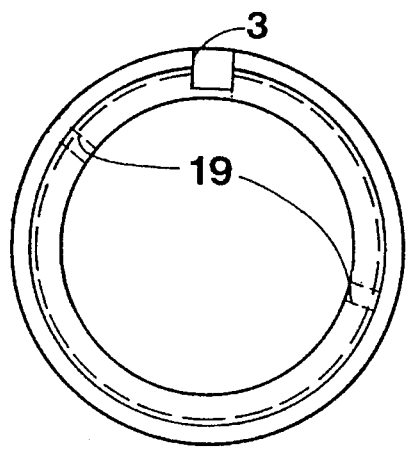
FIG. 15 is the end view showing the keyway and the two holes which accommodat the cotter pin used to position and secure the outer castellated lock ring on the axle spindle shown in FIG. 11.

With reference to FIG. 11, this cross section view of an industry axle 21 on which a hub 15 is mounted is similar in all respects to the earlier described cross sectioned drawing FIG. 2 except for the design of the threaded lock ring 18 shown in FIG. 12 which differs from threaded lock ring 12. In lieu of using an interference member 13 to secure threaded lock ring 18, a cotter pin 20 is placed in a castellation cavity shown in FIG. 13 of the threaded lock ring 18 through one of two existing holes 19 in the axle spindle shown in FIG. 15 to securely position the threaded lock ring 18 with respect to the axle spindle 21. At this point in the assembly process, the subsequent steps to be taken are as described in the procedure described for the preferred embodiment; specifically, rotating the inner adjustment nut 11 in the reverse direction by which it was originally installed with controlled torque and completing the assembly process as earlier described.

Figure 16:
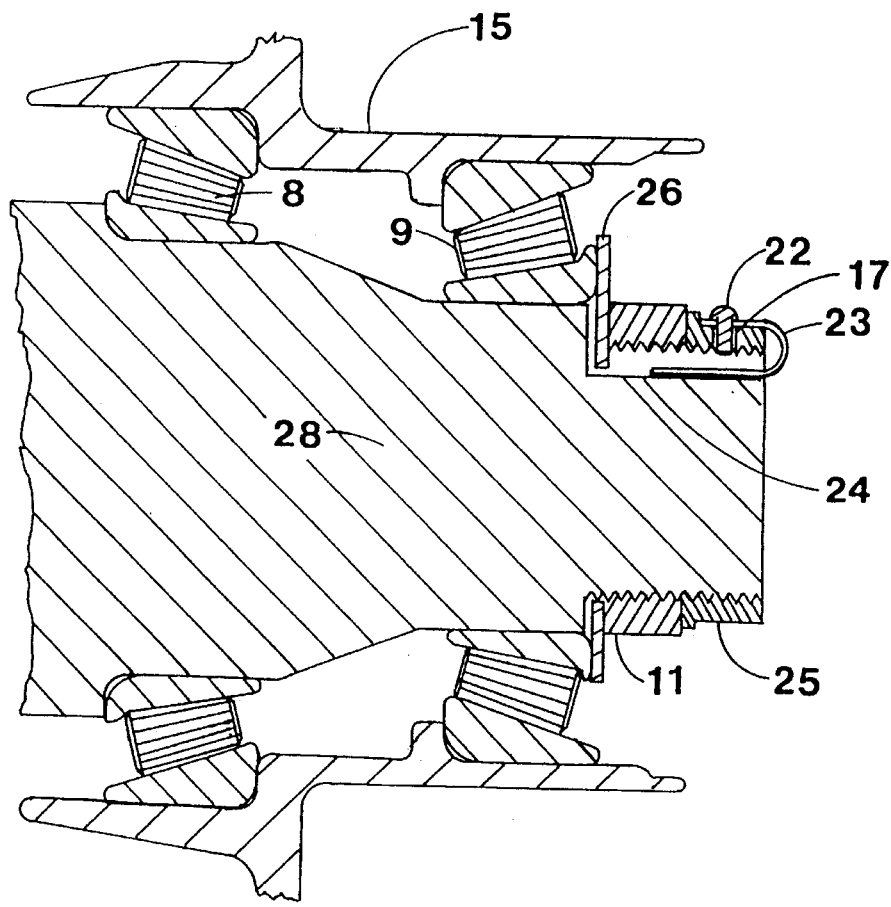
FIG. 16. illustrates a second alternate design capable of retrofitting a different type of spindle sometimes used on the steering axles of automobiles and truck/tractors. This configuration illustrates the method by which the original fasteners on an axle spindle having a milled flat can be replaced with a variation from the preferred embodiment by using the inner means shown in FIG. 5, the "D" washer shown in FIG. 19, the modified outer means shown as FIG. 21, and a different locking member shown as FIG. 22.
Figure 17:
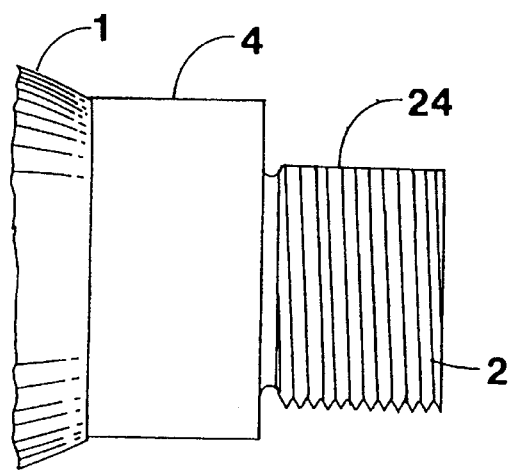
FIG. 17. shows the longitudinal plan view of the axle spindle depicted in FIG. 16.
Figure 18:
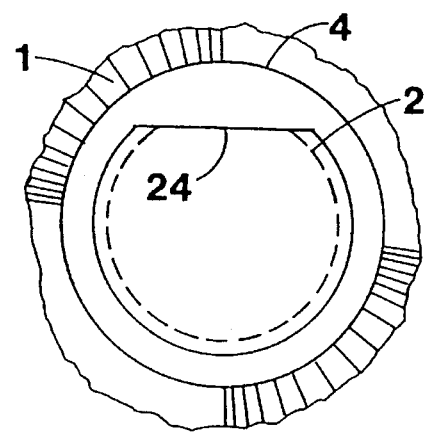
FIG. 18. shows the end view of the milled axle spindle illustrated in FIG. 17.

A second alternate design was conceived in order to provide controlled preload on another basic type of axle spindle. Having been informed by one manufacturer that their interests would be served if the preferred embodiment could be modified to retrofit axle spindles having a milled surface such as described in FIGS. 16, 17, and 18, this need was addressed as shown in FIG. 16. In this configuration, washer 10 is replaced with washer 26 as illustrated in FIGS. 19 and 20. This washer is a "D" washer having a flat segment 27 of its inner diameter that mates with the milled flat 24 on the axle spindle 28 making it impossible for it to rotate. The wheel 15 assembly mounting on the axle spindle 28 in this instance is accomplished using the same procedure described for the preferred embodiment. Following placement of the washer 26 in position adjacent to the outer tapered roller bearing 9, installing the adjustment nut 11 with controlled torque using a calibrated torque wrench to apply the desired preload pressure to the tapered roller bearings 8 and 9, a modified threaded lock ring 25 is positioned in finger tight contact with the adjustment nut 11 after which a different style of retainer 23 as shown in FIG. 22 is placed within the cavity described by the inner diameter of the threaded lock ring 25 and the milled flat 24 on the axle spindle. Moving the milled axle retainer clip 23 deeper into the aforementioned cavity, it becomes possible to engage its interconnecting member 22 into one of the annular index holes 17 in the threaded lock ring 25 which, coupled with the interlock provided by the lower portion of retainer 23 wedging in the space between the inner diameter of the threaded lock ring and the milled flat 24 of the axle spindle, secures the threaded lock ring 25 with respect to the axle spindle 28. Following this operation, the adjustment nut 11 is rotated in reverse rotation from that with which it was initially tightened until it becomes jammed against the thread lock ring 25 in accordance with the manufacturer's recommendations. As before, the desired amount of preload originally applied by the calibrated torque wrench is perpetuated in bearings 8 and 9 of the wheel 15 and axle 28 assembly.

Application of the principles of this invention described for the preferred embodiment and the two alternate concepts makes it possible to standardize the wheel retention systems on tractor/trailer combination vehicles providing control of tapered roller bearing preload at the three axle positions on the vehicle; the steer axle of the tractor, the drive axles of the tractor, and the axles of the trailer.

Although this invention is primarily concerned with the means for applying a definitively controlled preload force on the tapered roller bearing, another purpose can be served. There is still an interest on part of many vehicle operators to install wheels on their tractor/trailer combination vehicles providing some actual clearance between the adjustment nut and the outer face of the outer bearing before securing the wheel assembly on the axle. This procedure is easily accomplished by backing off the adjustment nut for a measured distance from the position where resistance to installation torque is first sensed before installing the threaded lock ring. Guidelines for doing this are well defined in recommended practices and industry standards.

Despite the principles of this invention having been described for application on tractor/trailer combination vehicles, it is visualized any automotive vehicle will benefit by having wheels similarly mounted on their axles.

While I have shown and described several version of my invention, this is by way of illustration and not limitation as there are other ways and various changes, alterations, eliminations, deviations and revisions which may be made in the embodiment shown without departing from the scope of my invention as defined only by a proper interpretation of the appended claims.

Particulars of the invention in which an exclusive property or privilege is claimed are as follows:

1. An axle nut system for preloading roller bearings comprising:

an axle having inner and outer roller bearings mounted thereon, said axle having an end portion, said end portion having threads thereon of a predetermined pitch which include outboard thread faces and inboard thread faces;

a washer member mounted on said end portion of said axle, said washer member abutting against at least a portion of the outer bearing, said washer member and said axle each having means thereon for preventing relative rotational movement between said washer member and said end portion;

an inner member mounted on the end portion of said axle and abutting against said washer member, said inner member having threads thereon of a predetermined pitch, said inner member establishing a compressive preload on said outer bearing through said washer member;

an outer member mounted on said end portion of said axle and abutting against said inner member, said outer member securing said inner member on said axle and having means associated therewith for preventing relative rotational movement between said outer member and said end portion of said axle; and said inner member being retained against retrograde axial movement by said outer member while retaining the compressive preload condition on said outer bearing by backing off said inner member with respect to the axle by engaging said inner member thread with said inboard thread faces of the axle threads so that said inner member becomes tightly immovable with respect to the outer member while retaining the compressive preload condition through said washer member on said outer bearing.

2. A system as defined in claim 1, wherein said means on said washer member and said axle for preventing relative rotational movement between said washer member and said end portion comprises a keyway on said end portion of said axle and a tabbed portion on said washer member, said tabbed portion on said washer member engaging said keyway on said end portion to prevent relative rotational movement between said washer member and said axle.

3. A system as defined in claim 1, wherein said means on said washer member and said axle for preventing relative rotational movement between said washer member and said end portion comprises a flat segment on said end portion of said axle and a milled flat on said washer member, said milled flat on said washer member abutting said flat segment on said end portion to prevent relative rotational movement between said washer member and said axle.

4. A system as defined in claim 1, wherein said outer member comprises a lock member.

5. A system as defined in claim 4, wherein said means associated with said lock member for preventing relative rotational movement between said lock member and said end portion of said axle comprises a retainer member having a portion which generally surrounds the lock member and a portion which extends through said lock member and engages a keyway on said axle.

6. A system as defined in claim 4, wherein said lock member has a castellated portion and said means associated with said lock member for preventing relative rotational movement between said lock member and said end portion of said axle comprises a cotter pin which engages said castellated portion of said lock member and extends through a hole in said end portion of said axle.

7. A system as defined in claim 4, wherein said axle has a flat segment on said end portion and said means associated with said lock member for preventing relative rotational movement between said lock member and said end portion of said axle comprises a retainer member which engages a portion of the lock member and engages said flat segment on said end portion, said retainer member having an interconnecting member attached thereto which extends through and engages a hole in said lock member.

8. A system as defined in claim 1, wherein said inner member comprises a nut, said nut having means thereon for engagement with a wrench.

9. A system as defined in claim 8, wherein said outer member has means thereon for deterring engagement with a wrench.

10. A method of providing a preload compressive condition on an axle comprising the steps of:

providing an axle having inner and outer roller bearings mounted thereon, said axle having an end portion, said end portion having threads thereon of a predetermined pitch which include outboard thread faces and inboard thread faces;

placing a washer member on said end portion of said axle;

moving said washer member into an abutting position with at least a portion of the outer bearing, said washer member being nonrotationally fixed with respect to the axle;

placing an inner member on the end portion, said inner member having threads thereon of a predetermined pitch;

establishing a compressive preload on said outer bearing through said washer member by moving said inner member against said washer member;

securing an outer member on said end portion for securing said inner member on said axle by moving said outer member into an abutting position with said inner member;

nonrotationally fixing said outer member with respect to the axle; and retaining said inner member against retrograde axial movement while retaining the compressive preload condition on said outer bearing by backing off said inner member with respect to the axle by engaging said inner member thread with said inboard thread faces of the axle threads so that said inner member becomes tightly immovable with respect to the outer member while retaining the compressive preload condition through said washer member on said outer bearing.

11. A method as defined in claim 10, wherein the inner member comprises an internally threaded nut having means thereon for engagement with a wrench, and wherein the step of establishing the compressive preload on said outer bearing through said washer member comprises tightening said nut with a wrench against said washer member to apply a predetermined amount of thrust force against said outer bearing through said washer member.

12. A method as defined in claim 11, wherein the step of securing the outer member on said end portion comprises finger tightening the outer member on said end portion until said outer member abuts against the nut such that the preload on the outer bearing is not increased.

13. The method as defined in claim 11, wherein the step of backing off said nut comprises rotating the nut with a wrench in a reverse direction from which the nut was initially rotated until said nut becomes immovable with respect to said outer member to prevent further movement between said nut and said axle.

14. An axle nut system for preloading roller bearings comprising:

an axle having inner and outer roller bearings mounted thereon, said axle having an end portion, said end portion having threads thereon of a predetermined pitch which include outboard threads and inboard threads;

an inner means mounted on the end portion of said axle, said inner means establishing a compressive preload on said outer bearing by moving said inner means into an abutting relationship with said outer roller bearing, said inner means including a nut having threads of a predetermined pitch;

a lock member mounted on said end portion of said axle and abutting against said nut, said lock member securing said nut on said axle, said lock member having structure associated therewith which prevents relative rotational movement between said lock member and said end portion of said axle; and said nut being retained against retrograde axial movement by said lock member while retaining the compressive preload condition on said outer bearing by backing off said nut with respect to the axle by engaging said inner member thread with said inboard thread faces of the axle threads so that said nut becomes tightly immovable with respect to the lock member.

15. A system as defined in claim 14, wherein said nut has tool engageable means and has a predetermined dimension between opposable tool engageable means and said lock member has a maximum outer diameter of a predetermined dimension which is smaller than the predetermined dimension between said opposable tool engageable means of said nut.

16. A system as defined in claim 15, wherein said nut has means thereon for engagement with a wrench and said lock member has means thereon deterring engagement with a wrench.

17. A system as defined in claim 14, wherein said inner means further includes a washer member mounted on said end portion of said axle, said washer member abutting against at least a portion of the outer bearing, said axle having a keyway on said end portion thereof and said washer having a tabbed portion thereon, said tabbed portion on said washer member engaging said keyway on said end portion to prevent relative rotational movement between said washer member and said axle.

18. A system as defined in claim 14, wherein said inner means further includes a washer member mounted on said end portion of said axle, said washer member abutting at least a portion of the outer bearing, said axle having a flat segment on said end portion thereof and said washer includes a milled flat thereon, said milled flat on said washer member abutting said flat segment on said end portion to prevent relative rotational movement between said washer member and said axle.

19. A system as defined in claim 14, wherein said structure associated with said lock member which prevents relative rotational movement between said lock member and said end portion of said axle comprises a retainer member having a portion which generally surrounds the lock member and a portion which extends through said lock member and engages a keyway on said axle.

20. A system as defined in claim 14, wherein said lock member has a castellated portion and said structure associated with said lock member which prevents relative rotational movement between said lock member and said end portion of said axle comprises a cotter pin which engages said castellated portion of said lock member and extends through a hole in said end portion of said axle.

21. A system as defined in claim 14, wherein said axle has a flat segment on said end portion and said structure associated with said lock member which prevents relative rotational movement between said lock member and said end portion of said axle comprises a retainer member which engages a portion of the lock member and engages said flat segment on said end portion, said retainer member having an interconnecting member attached thereto which extends through and engages a hole in said lock member.

22. A method of providing a preload compressive condition on an axle comprising the steps of:

providing an axle having inner and outer roller bearings mounted thereon, said axle having an end portion, said end portion having threads thereon of a predetermined pitch which includes outboard threads and inboard threads;

placing an inner means on the end portion of said axle, said inner means including a nut having threads thereon of a predetermined pitch;

establishing a compressive preload on said outer bearing by moving said inner means against said outer bearing to apply a predetermined amount of thrust force against said outer bearing;

securing a lock member on said end portion for securing said inner means on said axle by moving said outer member into an abutting position with said inner means;

retaining said lock member against rotational movement with respect to the axle; and backing off said nut with respect to the axle so that said inner member thread is engaged with said inboard thread faces of the axle threads so that said nut becomes tightly immovable with respect to the lock member while retaining the compressive preload condition on said outer bearing thereby retaining said nut against retrograde axial movement while retaining the compressive preload condition on said outer bearing.

23. A method as defined in claim 22, wherein the step of establishing a compressive preload on said outer bearing comprises rotating said nut with a wrench into an abutting position against said outer bearing.

24. A method as defined in claim 23, wherein the step of securing the lock member on said end portion comprises finger tightening the lock member on said end portion until said lock member abuts against the nut such that the preload on the outer bearing is not increased.

25. The method as defined in claim 24, wherein the step of backing off said nut comprises rotating the nut with a wrench in a reverse direction from which the nut was initially rotated to prevent further movement between said nut and said axle.

26. A method as defined in claim 22, wherein said inner means and said lock member are positioned between a wheel hub and said axle, said nut has opposable tool engageable means which can be engaged by a wrench and a predetermined dimension between opposable tool engageable means, and said lock member has a maximum outer diameter of a predetermined dimension, said maximum outer diameter of said lock member being less than the dimension between opposable tool engageable means of said nut, said lock member further having means thereon for deterring engagement of said lock member by a wrench; and wherein the step of backing off said nut comprises rotating the nut with a wrench in a reverse direction from which the nut was initially rotated to prevent further movement between said nut and said axle.

27. The method as defined in claim 22, wherein the step of establishing a compressive preload on said outer bearing includes the step of placing a washer member on said end portion of said axle with said washer member abutting at least a portion of the outer bearing, said washer member being nonrotationally fixed with respect to the axle.

* * * * *

UNITED STATES PATENT AND TRADEMARK OFFICE
CERTIFICATE OF CORRECTION

PATENT NO. : 5,560,687
DATED : October 1, 1996
INVENTOR(S) : George A. Hagelthorn It is certified that error appears in the above-indentified patent and that said Letters Patent is hereby corrected as shown below:

Column 3, Line 56 "accommodat" should be -- accommodate --

Column 5, Line 1 "nut 11 be" should be -- nut 11 will be --
Column 5, Line 4 "uncharged" should be -- unchanged --

Signed and Sealed this

Tenth Day of June, 1997

*Attest:*

BRUCE LEHMAN

*Attesting Officer*     *Commissioner of Patents and Trademarks*